April 7, 1942. E. E. HOFFMAN 2,279,264
HARDNESS TESTER
Filed Aug. 28, 1940
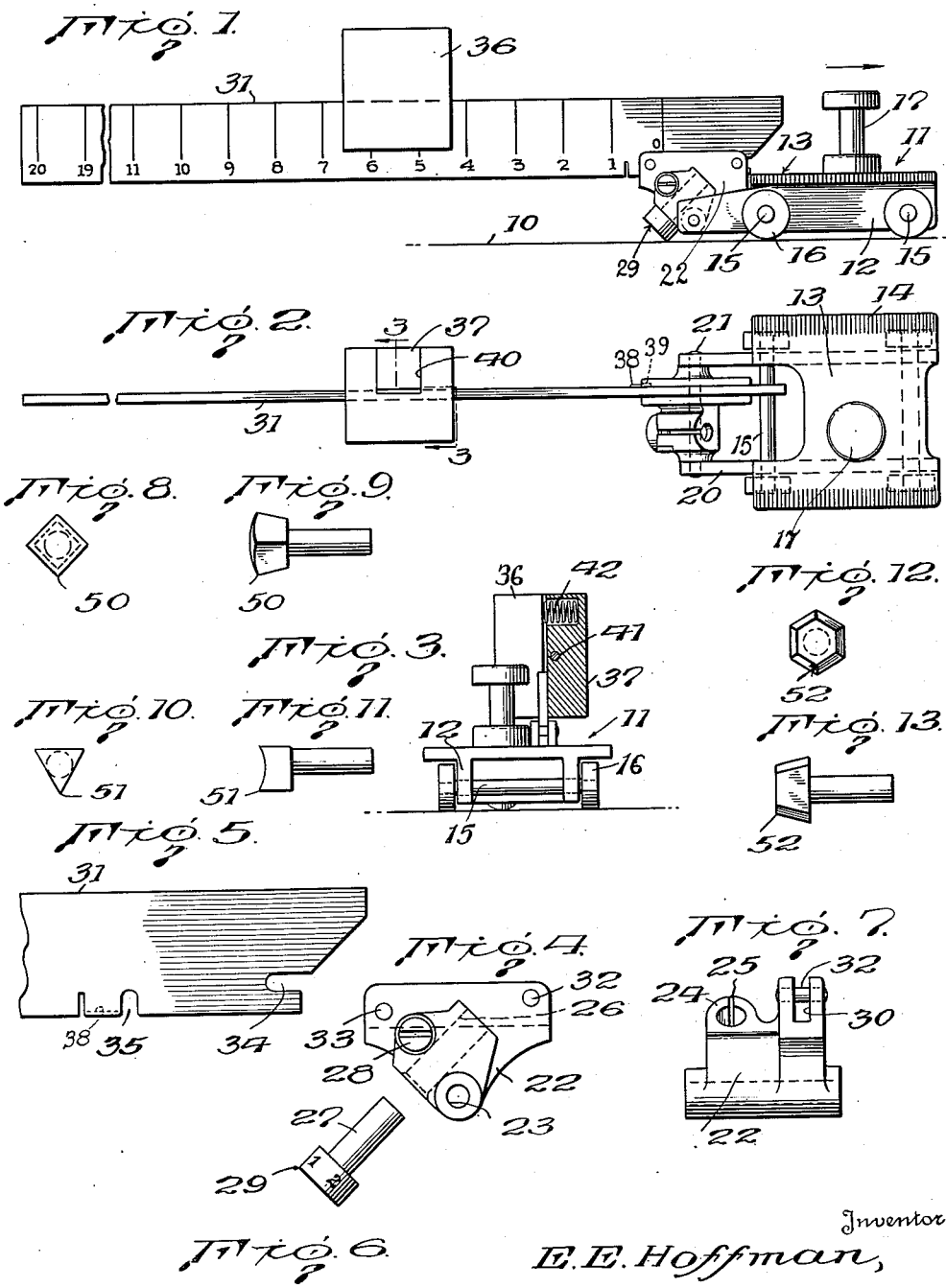
Inventor
E. E. Hoffman,
By K. P. McElroy
Attorney Patented Apr. 7, 1942

2,279,264

UNITED STATES PATENT OFFICE 2,279,264

HARDNESS TESTER

Earl E. Hoffman, Arlington, Va., assignor to National Paint, Varnish and Lacquer Association, Inc., Washington, D. C., a corporation of Delaware Application August 28, 1940, Serial No. 354,621

8 Claims. (Cl. 265—16)

This invention or discovery relates to hardness testers; and it comprises an apparatus for testing the hardness or scratch-resistance of painted surfaces and the like, including a wheeled carriage adapted to be moved over such a surface, a scratching member, a scale beam pivotally attached to the carriage and arranged to apply load to the scratching member and an adjustable rider on the beam; all as more fully hereinafter set forth and as claimed.

In the paint, varnish and lacquer arts it is often desirable to test the hardness of dried films of coating compositions applied to panels or other articles of manufacture. In particular it is often desired to measure the resistance of such paint films to scratching or scuffing. This can be done in a qualitative way with the finger nail but quantitative measurements present apparatus difficulties. Devices have been proposed involving movement of a test panel, supported on a moving frame, with respect to a stylus, weighted progressively to an increasing degree, the stylus load at which scratching first occurs being taken as a measure of the resistance to scratching of the test surface. However, these devices are massive and in general require provision of a special test panel of small size, to be mounted on a sliding table or the like for movement relative to the stylus. They are not adapted for testing such things as furniture, floors, etc. Attempts have been made to provide portable testers, but here difficulty is experienced because of the difficulty in maintaining a proper relation between the tester and the test surface.

There is a tendency for portable testers to slew, chatter and jump, when the stylus begins to dig into the surface, with vitiation of the measurements. There is the additional difficulty in securing in a portable apparatus the requisite rather heavy loading force for the stylus. Accordingly, only the relatively cumbersome stationary testers have found much use in the art.

According to the present invention a portable tester is provided, which is light and compact and readily applicable to surfaces of any size. At the same time it gives results of accuracy quite comparable with those secured with highly developed stationary testers. The tester in its best embodiment includes a carriage provided with wheels in such arrangement that the motion of the carriage over a test surface is confined to a straight and uniform path. The carriage is moved over the test surface by hand. A tool point or scratching member is provided adjacent one end of the carriage and arranged for free vertical movement with respect to the carriage, and a beam and rider are arranged to apply load to the tool point at a relatively high mechanical advantage. The beam is fulcrumed at a point intermediate the tool point and the rear carriage wheels, so that the tool point is brought against the test surface under load when the carriage is forced down on the surface by the fingers.

Operation is simple and reliable. The device is moved over the test surface to pull the tool point thereover, with progressive adjustment of the rider to apply greater and greater force to the scratch member. At some particular load, depending on the character of the surface, a scratch appears as the member moves across the surface. This load is taken as a measure of the hardness of the surface.

In the accompanying drawing there is shown, more or less diagrammatically, an example of a specific embodiment of apparatus within the purview of the invention. In the drawing—

Fig. 1 is a view of the tester in side elevation in position on a surface to be tested;

Fig. 2 is a view of the tester in plan;

Fig. 3 is a view of the tester in front elevation, the weight being shown in section along lines 3—3 of Fig. 2;

Fig. 4 is an enlarged view of the pivot bracket;

Fig. 5 is a detailed view of the inner end of the scale beam;

Fig. 6 shows one good form of tool point or marker;

Fig. 7 is a view in front elevation of the pivot bracket of Fig. 4; and

Figs. 8 to 13 are views of modified forms of tool points.

Referring to the drawing, Fig. 1 shows the instrument in its working position on a surface 10, the hardness of which is to be tested. The tester includes a carriage comprising a carriage frame 11 with depending flanges 12 and a flat top 13 overhanging the flanges and knurled at 14 to afford a grip for the thumb and fingers. The flanges are bored to receive a pair of axles 15, front and rear, each having a pair of wheels 16 attached in fixed relation to the axle as by riveting the ends of the axle. A knob or handle 17 is affixed near the middle of the frame for lifting the device.

The flanges are extended as indicated at 20 and are bored at their outer ends to receive a pin 21 serving as a pivot for a pivot bracket 22 (Figs. 4 and 7) having a lower bore 23 fitting on the pin. The bracket has an angularly disposed clamp portion 24 split at 25 and bored at 26 to receive a tool point or scratch member 27, held tightly in place by a screw 28. This point is of hardened tool steel, terminating in a sharp circular edge 29, the lower part of which rests on the surface under test, as shown in Fig. 1. The head of the tool point is numbered at 90-degree intervals, as shown so that when it becomes dull in one position it can be rotated to a new position and clamped therein by the screw. The pivot bracket is slotted at 30 to receive the end of a detachable scale beam 31. A bayonet joint is provided for the beam, including a pair of pins 32 and 33 extending across the slot and adapted to engage slots 34 and 35, respectively, in the end portion of the beam. A small resiliently supported nib 38 is adapted to enter a small narrow groove 39 at the bottom of one side of slot 30, to serve as a spring catch for locking the beam in place. The beam carries a rider 36 having a friction grip in the form of a block 37 free to oscillate in a wide slot 40 in the rider about a pivot 41 and urged in resilient contact with the beam by a spring 42, as shown. By squeezing the upper end of block 37 the rider is released. The scale beam has graduations as shown. The zero mark corresponds to the position of the rider (read from the outer edge thereof) at which the load on the tool point is zero. The beam can be graduated in any suitable units of mass or of hardness and is conveniently graduated in units of 100 grams. In the embodiment shown the divisions represent loads of 100, 200, etc. grams on the tool point. The length of scale beam depends on the range of hardnesses to be tested. For use with very hard surfaces the beam can be prolonged beyond the point shown or the rider can be made heavier.

In the embodiment shown the tool point is offset slightly to one side of the axis of symmetry of the carriage and the beam is offset slightly to the other side. This arrangement facilitates reading of the beam and also permits the rider to clear the socket in the zero position of the rider and to facilitate view of the path of the tool point. With this arrangement the knob 17 is best disposed in eccentric relation to the carriage in the position shown.

In operation, the device is placed on the surface as shown in Fig. 1. The surface should be fairly level and flat though this adjustment is not very critical. The rider is set at zero or some low graduation and the carriage is moved over the surface by hand, in the direction indicated by the arrow in Fig. 1, using sufficient downward pressure to keep the pair of wheels next to the marker in contact with the surface against the tendency of the beam and rider to lift them up (when the rider is not at zero). If the rider is at a suitably low value, the surface is not scratched by movement of the tool point thereover. The rider is then moved out slightly and the operation repeated, until at some position of the rider a scratch suddenly appears on the surface as the tool point is moved over it. The scale reading at this stage is noted as a measure of the hardness. The appearance of the scratch is quite definite. With the rider set a little below the critical point, the surface is unmarred and a very slight outward movement of the rider causes a distinct scratch to appear when the tester is again moved over the surface. The rider clamping arrangement (37, 42) permits the apparatus to be lifted up from the surface for close reading of the scale, without slippage of the rider. Very small surfaces, only a few centimeters long, can be readily tested with the apparatus.

The device is very compact, being shown only slightly smaller than its actual size. The scale beam is readily disengaged for transport. The apparatus is ordinarily embodied in brass, aluminum or other metal or, in part, in a suitable non-metallic plastic material.

The tool point can take other forms if desired than the sharp circular edge shown. Three optional shapes for the head of the tool point are shown in Figs. 8 to 13. Figs. 8 and 9 show, in front and side elevation, a tool point with a square edge providing four test corners or points 50. In Figs. 10 and 11 the edge is triangular to provide three corners 51, and in Figs. 12 and 13 the edge is hexagonal with six corners 52. The head can be parallel-sided or pyramidal as shown and the face of the head can be flat (Figs. 6 and 12) or concave (Figs. 10 and 11) or convex (Figs. 8 and 9). In some cases a material such as carborundum is used for the contact point.

What I claim is:

1. A hardness tester for surfaces comprising a carriage provided with at least one axle having wheels fixed thereto to turn together and constructed and arranged to support the carriage upon a surface for movement thereover and to constrain such movement to a fixed path, a scratching member movably mounted on said carriage, a scale beam attached fulcrum-wise to the carriage, extending at right angles to the axle means, and arranged to apply load to the scratching member, and an adjustable rider on the beam.

2. A light-weight portable hardness tester for surfaces comprising a carriage adapted to rest upon and be moved over a surface under test, an elongate scale beam pivotally secured to the carriage and extending beyond the carriage in a direction parallel to the axis of movement thereof, a scratching member mounted in fixed relation to the scale beam and adapted to be loaded by the scale beam at a point closely adjacent the pivotal axis of the scale beam, and a rider adjustable along the beam whereby to apply to the scratching member, by variable leverage, loads of magnitude ranging from a value less than that necessary to cause scratching of the surface, to a value sufficient to cause scratching.

3. A hardness tester for surfaces comprising a carriage provided with at least one axle having wheels fixed thereto to turn together and constructed and arranged to support the carriage upon a surface for movement thereover and to constrain such movement to a fixed path, a scratching member movably mounted on said carriage, and means for applying an adjustable load to said member, said means affording a range of loads from loads less than that necessary to scratch a surface to loads sufficient to scratch the surface.

4. A hardness tester for surfaces comprising a carriage, a front and a rear axle mounted for rotation with respect to the carriage, a wheel fixed to each end of each axle for rotation therewith, a bracket pivotally supported adjacent one end of the carriage, a marking member carried by the bracket and adapted to engage a surface over which the carriage moves, a scale beam affixed to the bracket and extending at a right angle to the axles, and a rider on the beam.

5. A hardness tester for surfaces comprising a carriage, a front and a rear axle mounted for rotation with respect to the carriage, a wheel fixed to each end of each axle for rotation therewith, a bracket pivotally supported adjacent the rear end of the carriage, a marking member carried by the bracket and adapted to engage a surface over which the carriage moves, at a point to the rear of said rear axle, a scale beam affixed to the bracket and extending at a right angle to the axles, and a rider on the beam.

6. In hardness testing apparatus of the class described a carriage adapted to be pulled over a surface to be tested for hardness, a tool point having a shank and an enlarged head of hard material with a plurality of projecting corners, clamp means for supporting the tool point shank from the carriage for free vertical movement with respect to the carriage, whereby the tool point is dragged over the surface as the carriage is pulled thereover, constructed and arranged so that the tool point can be fixed with any one of its corners in downward position and adjustable loading means for the tool point.

7. A hardness tester for surfaces comprising a carriage adapted to be drawn over a surface to be tested, a bracket pivotally attached to the rear of the carriage, a tool point for engaging the surface, mounted on the bracket at one side of the central axis of the carriage, a scale beam affixed to the bracket parallel to and at the other side of the central axis of the carriage and extending both rearwardly and frontwardly with respect to the axis of pivotal attachment of the bracket, and an adjustable rider on the beam movable along the beam either side of said axis.

8. A hardness tester comprising a carriage adapted to be drawn over a surface to be tested, a bracket pivotally attached to the carriage, a tool point mounted on the bracket and engaging the surface, an elongated scale beam and means detachably securing the beam at one end thereof to the bracket.

E. E. HOFFMAN.